April 7, 1959 W. S. WARREN 2,880,895
STONE PULLER ATTACHMENT
Filed March 15, 1957 2 Sheets-Sheet 2

INVENTOR.
WILLIAM S. WARREN
BY
McMorrow, Berman + Davidson
ATTORNEYS

United States Patent Office 2,880,895
Patented Apr. 7, 1959

2,880,895

STONE PULLER ATTACHMENT

William S. Warren, Hillsdale, Mich.

Application March 15, 1957, Serial No. 646,358

3 Claims. (Cl. 214—147)

The present invention relates to a stone puller attachment for use with a towing vehicle such as a tractor.

An object of the present invention is to provide a stone puller attachment for a tractor or other towing vehicle which enables the user to pull an embedded stone from a ground surface and to transport such stone to a place of disposal.

Another object of the present invention is to provide a stone puller attachment for a tractor or other towing vehicle which is easily positioned over a stone to be pulled and so constructed as to readily work an embedded stone loose from the ground surface by forward and backward movement of the tractor or towing vehicle.

A further object of the present invention is to provide a stone puller attachment for a tractor or other towing vehicle which lends itself to rapid and easy clearing of a ground surface of embedded or loose stones of a size difficult to remove by manual means, one sturdy in construction and of long wearing characteristics, one simple in structure, economical to manufacture and assemble, and one which is highly efficient in action.

These and other objects and advantages of the present invention will be fully apparent from the following description when taken in connection with the annexed drawings, in which:

Figure 3 is an elevational view in section taken on the line 3—3 of Figure 1.

Figure 1:
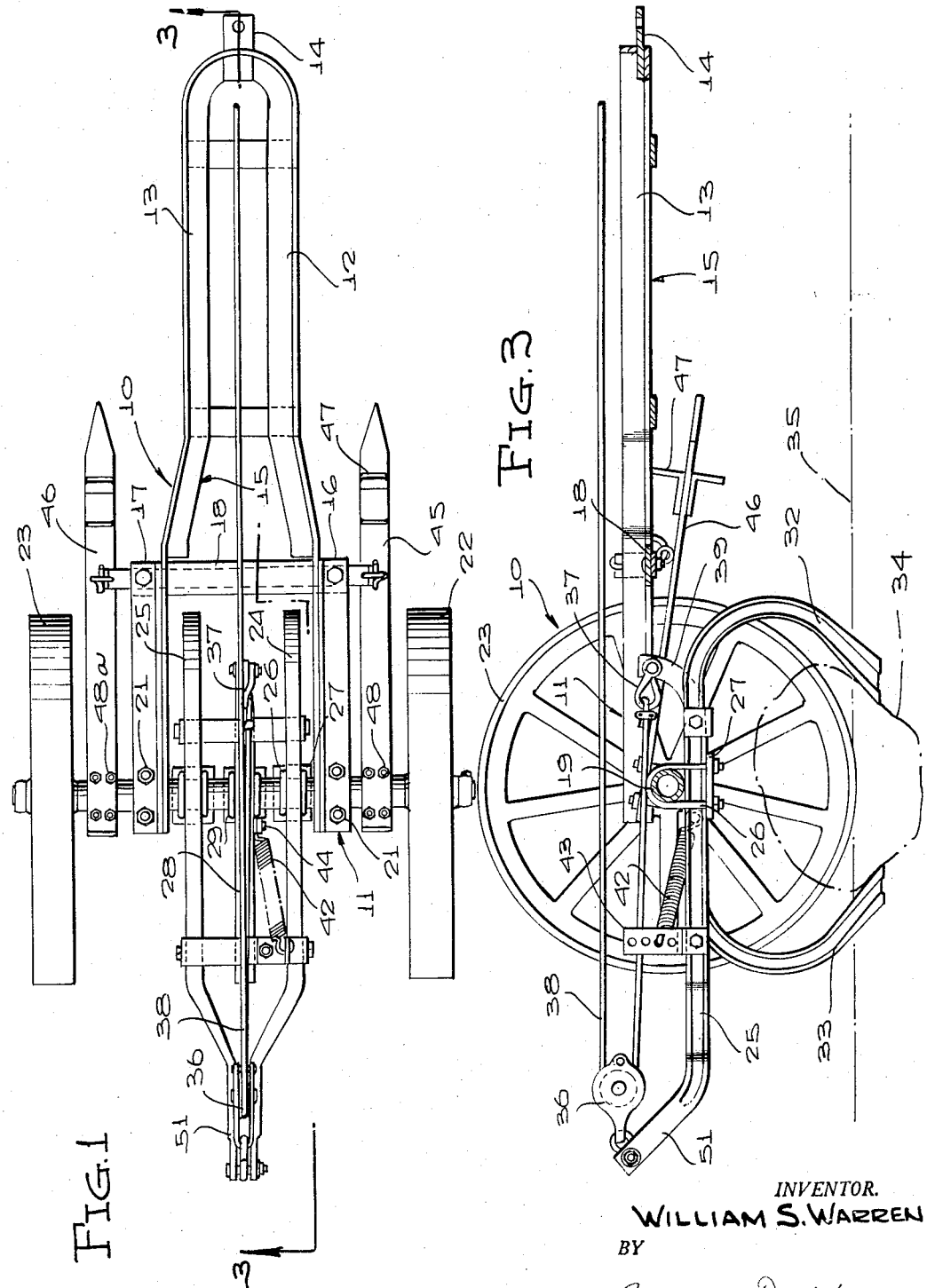
Figure 1 is a plan view of the stone puller attachment according to the present invention with the hooks in a position for engaging a stone.

Referring in greater detail to the drawings in which like numerals designate like parts throughout the several views, a stone puller attachment according to the present invention is designated generally by the reference numeral 10 and comprises a horizontally disposed frame 11 including side members 12 and 13 arranged in longitudinal spaced relation, the members 12 and 13 having on their front end a tongue 14 for attachment to a tractor or other towing vehicle, the latter not being shown.

Figure 2:
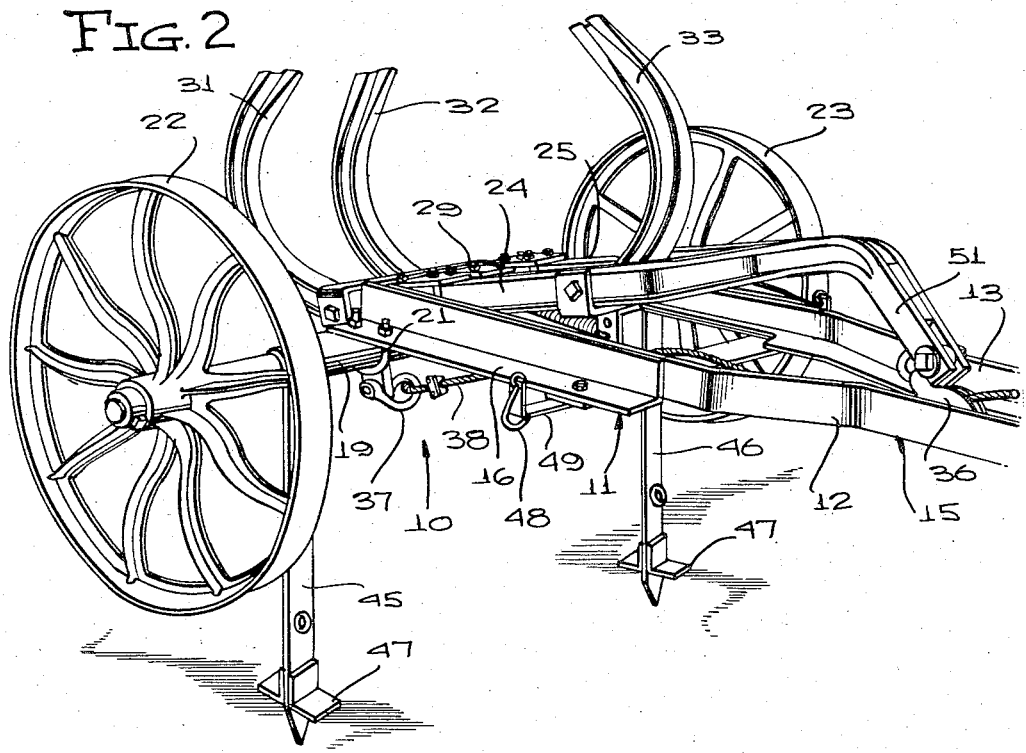
Fig. 2 is a fragmentary perspective view of the assembly of Figure 1, showing the hooks in the position above the axle and showing the elevating means engaging the ground surface and the wheels raised above the ground surface.

The frame side members 12 and 13 are formed, in part, of an angle iron piece designated generally by the reference numeral 15 and bent to a U-shape with the tongue 14 projecting outwardly of the bight thereof. Other angle iron pieces 16 and 17 extend outwardly from the legs of the piece 15 and are connected together at their forward ends by a cross member 18. The pieces 16 and 17 are connected at their rearward ends to an axle 19 by means of U-bolt assemblies 21, one of which is shown in Figure 2.

Wheels 22 and 23 on the ends of the axle 19 support the axle 19 and the attached frame 11 for rolling movement over the ground surface. A pair of lift bars 24 and 25 are arranged longitudinally of and between the side members 12 and 13, with the lift bar 24 adjacent the side member 12 and the lift bar 25 adjacent the side member 13. The lift bars 24 and 25 are connected by other U-bolt assembly 26 and rigid plate members 27, intermediate the ends of the lift bars 24 and 25, for simultaneous swinging movement together about the axle 19 as an axis. Another lift bar 28 is arranged longitudinally of and between the lift bars 24 and 25 and is connected intermediate its ends by means of another U-bolt assembly and plate member, as at 29, for swinging movement about the axle 19 as an axis independently of the swinging movement of the lift bars 24 and 25.

The lift bars 24 and 25 each have a concavely curved hook 31 and 32, respectively, on its forward end when the lift bar 24 or 25 is in its position below the axle 19, as shown in Figures 1 and 3. The single lift bar 28 also has a concavely curved hook 33 on its end which is rearwardly of the axle and below the axle 19 when the hooks 31, 32, and 33, are in the positions shown in Figures 1 and 3 for encircling and lifting a stone 34 from the ground surface 35, the stone and ground surface being indicated in dotted lines in Figure 3.

The ends of the lift bars 24 and 25 remote from their hooks 31 and 32 are upwardly curved and extend above and rearwardly of the axle 19 when the lift bars 24 and 25 are in their transverse spaced aligned position below the axle 19. The hooks 31 and 32, when in such position, face rearwardly and toward the axle 19. The hook 33 of the lift bar 28, when the lift bar 28 is below the axle 19, faces forwardly and is rearwardly of the axle 19.

Means is provided connecting the rearward ends of the lift bars 24 and 25 and the forward end of the lift bar 28 together so that the respective hooks 31, 32 and 33 are in turn moved toward each other and thence while being retained in the forward position are moved to a position in which the respective hooks 31, 32 and 33 are reversed with the hooks 31 and 32 rearwardly of and above the axle 19 and facing the axle 19 and with the hook 33 forwardly of and above the axle 19 and facing the axle 19. Specifically, this means consists in a block and tackle assembly comprising a sheave or pulley 36, a clevis 37, and a cable 38. The pulley 36 is supported upon a nut and bolt assembly extending between the converged ends of the lift bars 24 and 25 and the clevis 37 is pivotally connected by conventional means such as a bolt to the upwardly curved portion 39 of the lift bar 28 when the lift bar 28 is in its position below the axle 19. One end of the cable 38 is secured to the clevis 37 by a clamp member 41 and the other end is operatively attached to a pulling element such as a winch or ratchet type fence stretcher, or other power means electrically, hydraulically, or manually operable, such power means not being shown as not being a part of the present invention.

Spring means is provided operatively connected to the lift bars 24 and 25 and to the lift bar 28 for urging the hook 33 away from the hooks 31 and 32. Specifically, this spring means embodies a coil spring 42 having one end formed with a hook reecived in one of several holes provided in a bracket 43 which projects perpendicularly from the one lift bar 25 between the point of connection of the pulley 36 and the axle 19. The other end of the spring 42 is formed with an eye-formation and anchored by bolt means to the lift bar 28 at a point intermediate the connection of the lift bar 28 to the axle 19 and the hook 33, the connection of the latter named end of the coil spring 42 to the lift bar 28 being indicated by the reference numeral 44 in Figure 1.

Elevating means is provided by the present invention for raising the wheels 22 and 23 and the transversely arranged axle 19 to a position above the ground surface 35 so that the hooks 31, 32, and 33 may be positioned over and lowered to a position embracing a stone to be removed from the ground surface. Specifically, the elevating means comprises a pair of lifting jacks or arms 45 and 46, each having one end connected to the axle 19 for rotation about the axle 19 as an axis, the arms 45 and 46 being spaced inwardly from the wheels 22 and 23, respectively, and having their free ends pointed and the portions of their free ends inwardly of the pointed end provided with oppositely disposed angle iron members 47 for resisting the entrance of the arms 45 and 46 into the ground when in a position supporting the wheels 22 and 23 above the ground. The arms 45 and 46 are connected to the axle 19 by other U-bolt assemblies, not shown in detail, indicated by the reference numeral 48a in Figure 1.

In operation, the stone puller attachment 10 is connected by the tongue 14 to a tractor or other vehicle and the lift bars 24 and 25 and 28 are raised to the position shown in Figure 2, with the hooks 31 and 32 and the hook 33 pulled by the coil spring 42 to the position away from each other. The stone puller attachement 10 is then transported on its wheels 22 and 23 across the ground surface to the stone 34 to be pulled. The lifting jacks or arms 45 and 46 are each next unhooked from a hook 48 which hangs from the free end of an L-shaped bracket 49 projecting outwardly from the adjacent one of the side members 12 and 13 at the point of connection of the cross member 18 to the respective side members 12 and 13. The arms 45 and 46 are normally suspended from such hooks 48, while the stone puller attachement 10 is transported to and from the stone to be removed and the place of disposal of such a stone.

By trial and error, the positioning of the axle relative to the stone to be removed will be established and at this point the arms 45 and 46 are permitted to engage the ground surface 35. The towing vehicle or tractor next pulls the stone puller attachment in the direction which will raise the wheels 22 and 23 to an elevated position, as shown in Figure 2, with the attachment 10 supported by the tongue 14 and the arms 45 and 46. The cable 38 is next allowed to slacken and a manually applied force to the portion 51 of the lift bars 24 and 25 adjacent the attachment of the pulley 36 in an upwardly direction will cause the hooks 31 and 32 and the hook 33 to swing from their position above the axle 19 to a position below the axle 19 with the hooks 31 and 32 on one side of the stone 34 and the hook 33 on the other side of the stone. Preferably, this position will be such that upon reversing of the tractor and lowering of the axle 19 from its elevated position, the two hooks 31 and 32 will first engage the stone 34. As has been stated, the exact positioning of the axle 19 relative to the stone 34 will be obtained by trial and error methods, taking into consideration the size of the stone 34 and its position relative to the ground surface 35.

Figure 4:
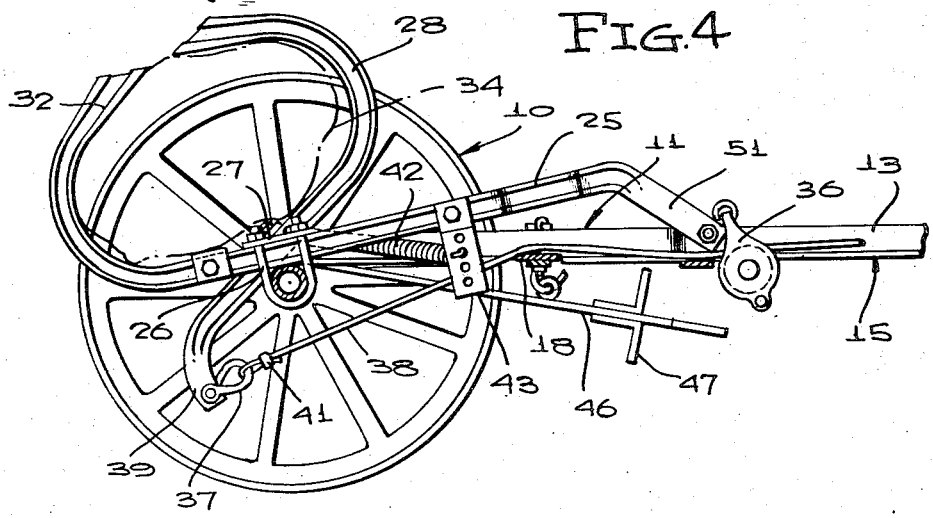
Figure 4 is a fragmentary elevational view in section, showing the hooks raised above the axle and supporting a stone for transport of the latter to a place of disposal, the stone being shown in dotted lines.

With the hooks 31 and 32 and the hook 33 on opposite sides of the stone 34, the slack in the cable 38 is taken up and the power means is applied to the cable 38 to first move the portion 39 of the lift bar 28 and the portion 51 of the lift bars 24 and 25 toward each other. This causes the hooks 31 and 32 on one side of the stone 34 and the hook 33 on the other side of the stone 34 to tightly embrace the stone. By rocking the tractor forwardly and backwardly for short distances and continued pull upon the cable 38, the hooks will work themselves under the stone 34 and, with the tractor unmoving, continued application of pulling effort on the cable 38 will result in the swinging movement of the lift bars 24 and 25 and the lift bar 28 from their positions below the axle 19 to the position above the axle 19 carrying between their respective hooks the stone 34, as shown in Figure 4.

After traveling to the point of disposal of such a stone 34, the arms 45 and 46 may be again moved from their suspended position to a position rearwardly of the axle 19 and the stone puller attachment 10 reversed by reversing the movement of the tractor. The cable 38 is then slackened. permitting the spring 42 to pull the hook 33 away from the hooks 31 and 32 and allowing the stone 34 to roll to the ground surface at the point of disposal.

It will be seen, therefore, that the stone puller attachment 10 of the present invention may be attached to any towing vehicle and may be used to quickly and efficiently clear a ground surface of stones of a size which are difficult to remove manually, the stones being either embedded in the ground surface or free thereabove.

The raising and lowering of hooks 31, 32 and 33, while in the process of pulling a stone, may also be accomplished by attaching the frame side members 12 and 13 to the rear mounted hydraulic lift arms of a tractor or other vehicle.

This application is a continuation-in-part of application, Serial No. 560,346, filed January 20, 1956, now abandoned.

What is claimed is:

1. A stone puller attachment comprising a horizontally disposed frame including a pair of side members arranged in longitudinal spaced relation, means on the front end of said members for attachment to a towing vehicle, a wheel supported axle extending transversely of said side members and carried by said side members, a pair of lift bars arranged longitudinally of and between said side members below said axle and connected intermediate their ends for simultaneous swinging movement together about said axle as an axis, each of said lift bars having a concavely curved hook on the forward end thereof, the hooks being in transversely spaced alignment and each being normally below said side members and forwardly of and facing toward said axle, another lift bar arranged longitudinally of and between said pair of lift bars below said axle and connected intermediate its ends for swinging movement about said axle as an axis independently of said pair of lift bars, said another lift bar having a concavely curved hook on the rearward end thereof, said another lift bar hook being normally below said side members and rearwardly of and facing toward said axle, and means connecting the rearward ends of said pair of lift bars and the forward end of said another lift bar together so that the hooks on said pair of lift bars and the hook on said another lift bar are in turn moved toward each other from the positions forwardly of and facing toward said axle and rearwardly of and facing toward said axle respectively and thence while being retained in the position of movement toward each other to a position in which the hooks on said pair of lift bars are rearwardly of and above and facing said axle and the hook on said another lift bar is forwardly of and above and facing said axle.

2. A stone puller attachment comprising a horizontally disposed frame including a pair of side members arranged in longitudinal spaced relation, means on the front end of said members for attachment to a towing vehicle, a wheel supported axle extending transversely of said side members and carried by said side members, a pair of lift bars arranged longitudinally of and between said side members below said axle and connected intermediate their ends for simultaneous swinging movement together about said axle as an axis, each of said lift bars having a concavely curved hook on the forward end thereof, the hooks being in transversely spaced alignment and being normally below said side members and forwardly of and facing toward said axle, another lift bar arranged longitudinally of and between said pair of lift bars below said axle and connected intermediate its ends for swinging movement about said axle as an axis independently of said pair of lift bars, said another lift bar having a concavely curved hook on the rearward end thereof, said another lift bar hook being normally below said side members and rearwardly of and facing toward said axle, means connecting the rearward ends of said pair of lift bars and the forward end of said another lift bar together so that the hooks on said pair of lift bars and the hook on said another lift bar are in turn moved toward each other from the positions forwardly of and facing toward said axle and rearwardly of and facing toward said axle respectively and thence while being retained in the position of movement toward each other to a position in which the hooks on said pair of lift bars are rearwardly of and above and facing said axle and the hook on said another lift bar is forwardly of and above and facing said axle, and spring means operatively connected to said pair of lift bars and to said another lift bar for urging the hook of said another lift bar away from the hooks of said pair of lift bars.

3. A stone puller attachment comprising a horizontally disposed frame including a pair of side members arranged in longitudinal spaced relation, means on the front end of said members for attachment to a towing vehicle, a wheel supported axle extending transversely of said side members and carried by said side members, a pair of lift bars arranged longitudinally of and between said side members below said axle and connected intermediate their ends for simultaneous swinging movement together about said axle as an axis, each of said lift bars having a concavely curved hook on the forward end thereof, the hooks being in transversely spaced alignment and being normally below said side members and forwardly of and facing toward said axle, another lift bar arranged longitudinally of and between said pair of lift bars below said axle and connected intermediate its ends for swinging movement about said axle as an axis independently of said pair of lift bars, said another lift bar having a concavely curved hook on the rearward end thereof, said another lift bar hook being normally below said side members and rearwardly of and facing toward said axle, and block and tackle means connecting the rearward ends of said pair of lift bars and the forward end of said another lift bar together so that the hooks on said pair of lift bars and the hook on said another lift bar are in turn moved toward each other from the positions forwardly of and facing toward said axle and rearwardly of and facing toward said axle respectively and thence while being retained in the position of movement toward each other to a position in which the hooks on said pair of lift bars are rearwardly of and above and facing said axle and the hook on said another lift bar is forwardly of and above and facing said axle.

References Cited in the file of this patent

UNITED STATES PATENTS

| | | |
|---|---|---|
| 1,079,939 | Gustin | Dec. 2, 1913 |
| 1,153,223 | Hendrickson | Sept. 14, 1915 |
| 2,672,318 | Lee | Mar. 16, 1954 |
| 2,741,041 | Wilson | Apr. 10, 1956 |
| 2,745,565 | Johnson | May 15, 1956 |